G. M. CONWAY.
METHOD FOR UTILIZING SPENT BARK OR ANALOGOUS MATERIAL AS A FUEL.
APPLICATION FILED APR. 16, 1910.

1,013,988.

Patented Jan. 9, 1912.

G. M. CONWAY.
METHOD FOR UTILIZING SPENT BARK OR ANALOGOUS MATERIAL AS A FUEL.
APPLICATION FILED APR. 16, 1910.

1,013,988.

Patented Jan. 9, 1912.

4 SHEETS—SHEET 2.

G. M. CONWAY.
METHOD FOR UTILIZING SPENT BARK OR ANALOGOUS MATERIAL AS A FUEL.
APPLICATION FILED APR. 16, 1910.
1,013,988.
Patented Jan. 9, 1912.
4 SHEETS—SHEET 3.
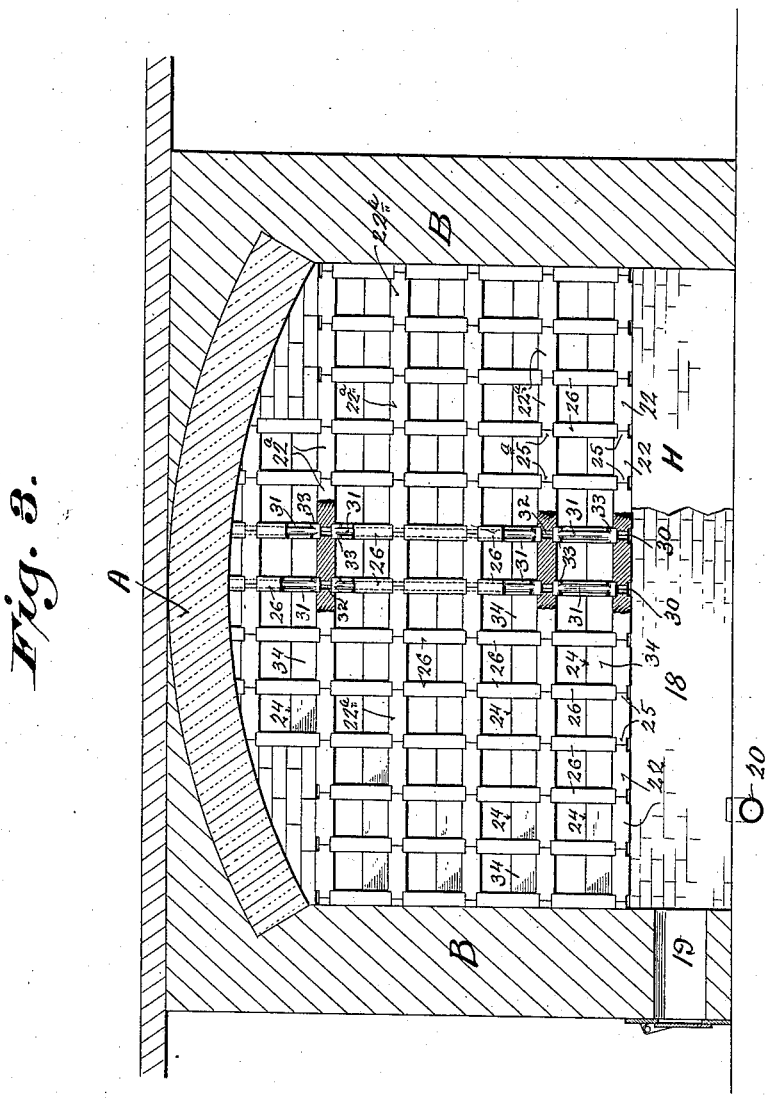

G. M. CONWAY.
METHOD FOR UTILIZING SPENT BARK OR ANALOGOUS MATERIAL AS A FUEL.
APPLICATION FILED APR. 16, 1910.
1,013,988.
Patented Jan. 9, 1912.
4 SHEETS—SHEET 4.
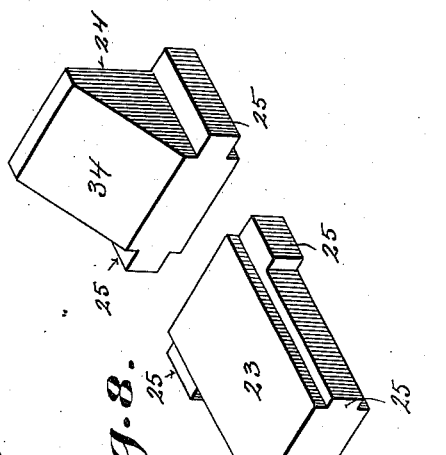
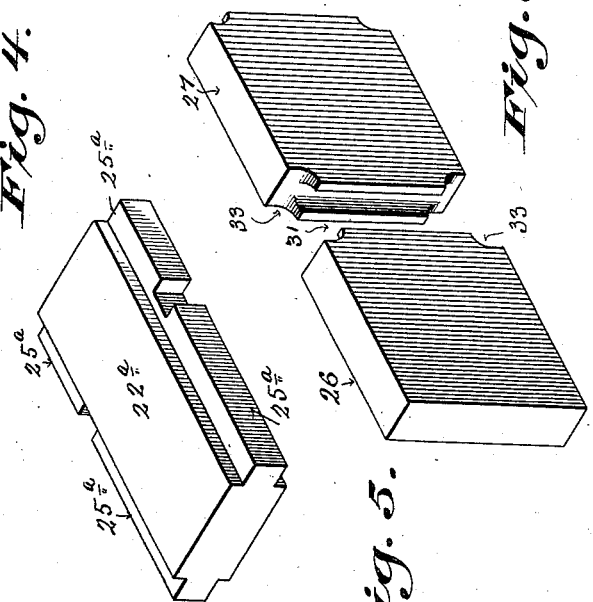
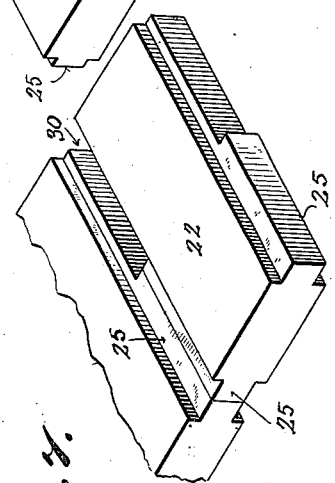
Witnesses
May Downey
Thos J. Jnlastank
Inventor:
George M. Conway.
By Oliphant & Young
Attorneys.

UNITED STATES PATENT OFFICE.

GEORGE M. CONWAY, OF MILWAUKEE, WISCONSIN.

METHOD FOR UTILIZING SPENT BARK OR ANALOGOUS MATERIAL AS A FUEL.

1,013,988.  Specification of Letters Patent.  Patented Jan. 9, 1912.

Application filed April 16, 1910. Serial No. 555,942.

*To all whom it may concern:*

Be it known that I, GEORGE M. CONWAY, a citizen of the United States, and resident of Milwaukee, in the county of Milwaukee and State of Wisconsin, have invented certain new and useful Improvements in Methods for Utilizing Spent Bark or Analogous Material as a Fuel; and I do hereby declare that the following is a full, clear, and exact description thereof.

My invention consists in what is herein particularly set forth with reference to the accompanying drawings and pointed out in the claim of this specification, its object being to provide an economical and efficient method for utilizing disintegrated combustible fibrous substances as a fuel, the method being such that by the proper mingling of light carbureted hydrogen gas, which is freed from the combustible substance, with a proportionately small quantity of rich carbon gas approximately perfect combustion is obtained, whereby the maximum amount of heat units, in proportion to the fuel consumption, is generated for commercial purposes, the mixed gases being supplied with the proper quantity of air to form perfect combustion, and thus all smoke generated from the carbureted hydrogen gas is consumed.

In order to more clearly define my improved method, I have illustrated in the accompanying drawings, a furnace adapted for accomplishing the desired results.

Figure 1:
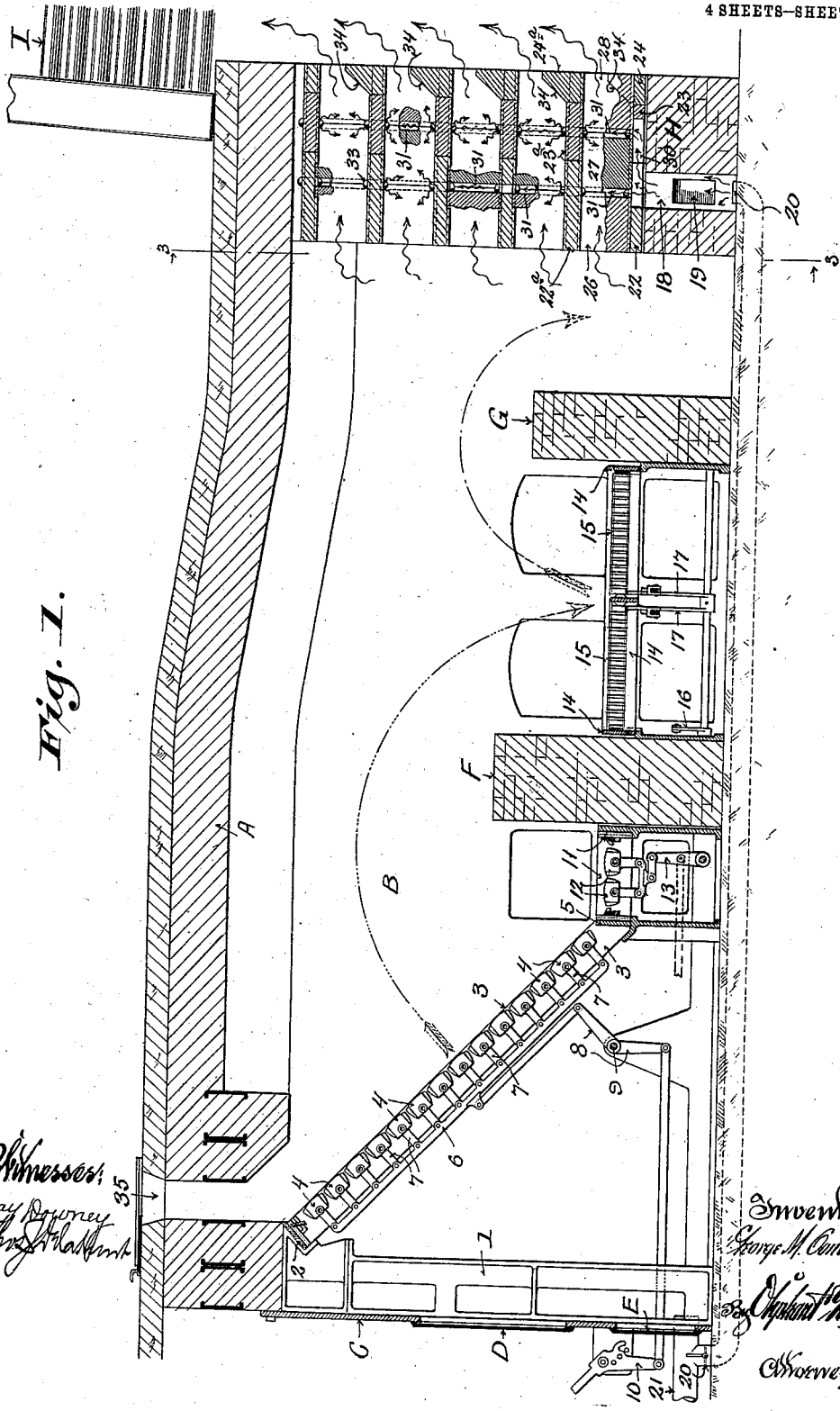
Figure 2:
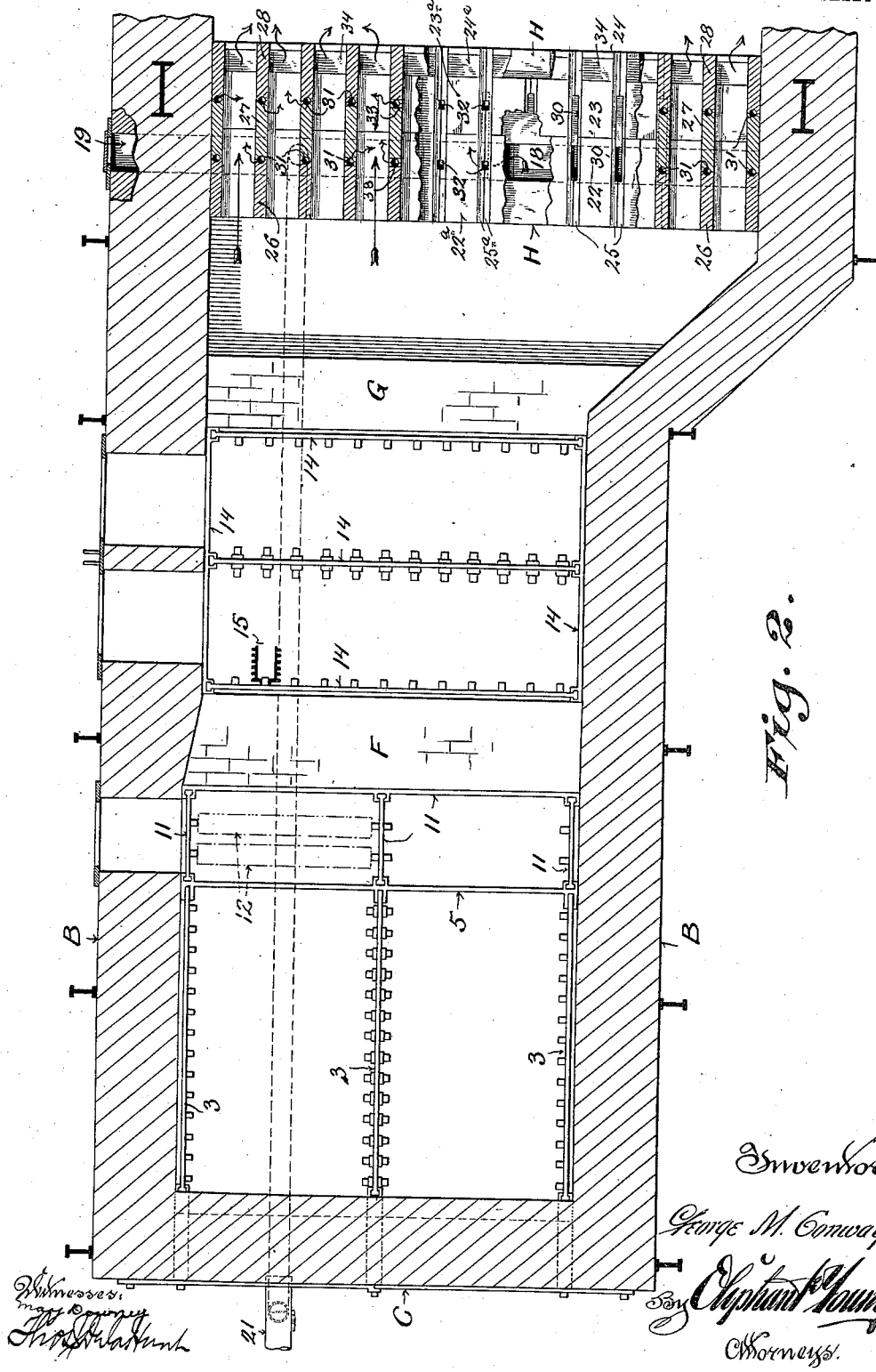

In the drawings—Figure 1 represents a longitudinal sectional view of a furnace embodying the features of my invention with parts broken away and parts in section to more clearly illustrate the structural features; Fig. 2, a sectional plan view of the same with parts removed and parts broken away to more clearly show details of construction; Fig. 3, a transverse sectional view of the furnace as indicated by line 3—3 of Fig. 1, and Figs. 4, 5, 6, 7, 8 and 9, detail views of various tiles or fire brick employed in the construction of the furnace, these tiles being built up to form a cellular partition, through which the gases pass coincident to the admission of air thereto in a sufficient quantity to form perfect combustion.

Referring by characters especially to Fig. 1, A represents the arched top and B the side walls of a furnace of standard construction, the front of which is closed by the usual metallic plate or plates C provided with clean-out and ash-pit doors D, E. Just rear of plate C the furnace is provided with vertical supporting columns 1, into the heads of which columns is suitably fitted a bearing-bar 2, which bar in connection with a series of longitudinal bearing-bars 3 constitute a rectangular frame for a series of oscillatory grate sections 4, the grate sections each being swiveled upon studs that extend from the bearing-bars 3. The said supporting frame for the grate sections is disposed at approximately an angle of 45°, the lower ends of the bearing-bars 3 of which frame being supported in sockets of a horizontally disposed transverse-bar 5.

As best shown in Fig. 2, the angularly disposed grate surface just described, is preferably formed into two separate series upon opposite sides of the central or intermediate bearing-bar 3 of the frame, and the grate sections of each series are connected by a metallic strip 6 that is in hinge connection with depending arms 7 of each of said grate sections. The strips 6 (only one of which is shown) are in link connection with a lever 8 that is fulcrumed upon a suitably supported rod 9 within the ash-pit, this lever in turn being linked to a shaking and dumping arm 10, which arm is fulcrumed to a bracket that extends from the front plate C as shown in Fig. 1.

While I have shown the shaking and dumping arm as being arranged for hand manipulation it is apparent that the same may be automatically controlled by suitable mechanical motive power in some instances.

The transverse-bar 5 constitutes one member of a rectangular frame 11, in which frame is mounted a series of horizontally disposed grate sections 12, which grate sections are similar to those just described in connection with the angularly disposed grate surface. The horizontal grate sections are each provided with a lever connection 13 that depends within the ash-pit for shaking and dumping and this lever connection may, if desired, be provided with a link mechanism extending to the front of the furnace, in suitable link connection therewith similar to that shown in connection with the angular grate surface. The horizontal surface is also provided with doors communicating with the ash-pit and the upper surface of the grate, for clean-out purposes.

A bridge-wall F extends transversely of the furnace and just rearwardly of the horizontal grate, there being a similar bridge-wall G disposed rearwardly of and at a suitable distance from the first named bridge-wall. Mounted in a frame 14 between these bridge-walls are two series of longitudinally disposed grate sections 15, similar to the grate sections previously described, these grate sections, in connection with the bridge-wall F, G, forming a fire-box, which fire-box, in the operation of the furnace is supplied with a suitable bed of fuel coal, the purpose of which will be hereinafter mentioned. The fire-box is also provided with doors above and below the grate sections for access thereto in feeding and cleaning, it being understood that the said grate is also provided with suitable shaking and dumping lever connections 16, 17, respectively.

A transverse abutment H extends across the furnace at a distance rearwardly of the second bridge-wall G, the space between which bridge-wall and abutment constitutes a mixing chamber. The abutment is also provided with a transverse air-duct 18, which air duct communicates with the outside atmosphere, its inlet 19 being under suitable damper control, whereby the proper quantity of air for combustion purposes is regulated. This duct is for the purpose of admitting air under natural draft, but in some instances I prefer to use a forced draft, in which case air is admitted to the longitudinal duct 18, from a valve-controlled branch-pipe 20, that extends from a forced draft-pipe 21 at the front of the furnace and is arranged to discharge within the duct 18 as best shown in Fig. 1. The forced draft pipe 21 communicates directly with the ash-pit under the angularly disposed grate surface, whereby a sufficient quantity of air is maintained at this point to form combustion for the tan bark or other substance which is being utilized as a fuel upon said grate.

Between the top face of the abutment H and the top and side walls of the furnace, a series of horizontal and vertical tiles are arranged, forming a cellular partition through which the products of combustion are led, prior to their passage under the boiler I, a section of which boiler is shown in Fig. 1, it being understood that the form of boiler in connection with my improved furnace forms no part of this invention.

The base of the cellular partition is formed by successive series of horizontally disposed flat tiles 22, 23 and 24, these tiles being alined in series to abut each other end for end, the series being duplicated laterally throughout the width of the partition. Each of the tiles 22, 23 and 24 are provided with lateral side flanges 25 of less thickness than the body of the tile and these side flanges, when abutted against the side flanges of the next series, thus form countersunk grooves for the reception of successive series of vertically disposed tiles 26, 27, 28, each series when assembled thus forming vertical partition walls. The flanges of the horizontal tiles 22 and 23 are partly cut away throughout their length to form horizontal air passages 30, which air passages communicate with the air duct 18. The abutting ends of the vertical tiles 26, 27 and 28 respectively, that fit within the countersunk grooves, are provided with concavo-convex ends, which ends, when abutted, form vertical air channels 31. These air channels communicate with the horizontal air passages 30, and thus air from the duct 18 is free to pass upwardly and through the various vertical walls formed by the tiles 26, 27 and 28.

After the first series of vertical tiles is laid upon the first series of horizontal tiles, a second series or layer of horizontal tiles $22^a$, $23^a$ and $24^a$ are fitted upon the top edges of said vertical tiles. The last named series of horizontal tiles are similar in construction to the first named series, with the exception that the flanges $25^a$ of the second tiles $22^a$ and $23^a$ are notched out, as shown in Fig. 4, in such manner that when the flanges of two sets of these tiles are fitted together they form apertures 32, as best shown in Figs. 2 and 3 of the drawings, which apertures register with the vertical air channels 31, formed by the tiles 26, 27 and 28, whereby communication is had through the horizontal layers of tiles and sections of vertical tiling.

The upper and lower edges of the concavo-convexed ends of the tiles 26, 27 and 28 are notched out to form cross-grooves 33, whereby air from the vertical air passages 31, is discharged and forced to mingle with the gases as they pass through the cellular partition. The last horizontal tiles 24 and $24^a$, of the horizontal series of layers are of greater thickness than the remainder, being formed with angular faces 34, which faces extend upwardly from the flat faces of the tiles 22 and 23. Thus the various longitudinal cells or passages through the partition are choked at their discharge ends, whereby the gases, being checked slightly, are thus forced to mingle and thoroughly mix with the air prior to discharge. The cellular partition is thereafter completed by the addition of alternate layers of horizontal and vertical tiling as just described, whereby a series of longitudinal passages are formed through which the gases pass.

The top wall of the furnace is provided with a damper-controlled feed aperture 35, which aperture is alined with the highest point of the angular grate section. The tan bark or other substance to be utilized as fuel is arranged in a pyramid upon the top wall over the feed aperture and this fuel is thereby discharged by gravity through said aperture to the grate surface below, over which it slowly flows by gravitation, in a mass of uniform thickness while being consumed. The forced air blast from pipe 21 increases the consumption of the spent tan bark as it passes over the angular grate. Should the tan bark tend to clog upon the grate surfaces, the shaker mechanism in connection therewith is utilized for starting the flow of the material. This action of the grate also serves to clear its surface from ashes and keep the openings thereof free for the passage of air. The material being consumed slowly moves toward the horizontal grate section while being consumed, which grate section forms a basin or trap to catch clinkers or non-combustible materials that are deflected from the angular grate. This refuse caught by the horizontal grate can be readily disposed of by the dumping mechanism and removed through the cleaning doors.

In carrying out my method the consumption of the tan bark causes the vaporization of the small percentage of water it contains and the burning of the material furnishes carbon and hydrogen, forming a light carbureted hydrogen gas. This gas would not furnish sufficient heat to supply the requisite temperature for boiler capacity and hence the supplemental coal grate is provided, separately and distinct from the angular grate, upon which supplemental grate a bed of coal is fed. This coal, when ignited, generates a rich carbon gas and as the light carbureted hydrogen gas passes over the said coal grate the two gases mix. The resulting mixture of the rich coal gas and spent bark gas, produces a rich carbureted gas which is not in perfect combustion. In this state it passes over the second bridge-wall and drops into the mixing chamber, from which chamber it rises and passes through the cellular partition formed by the tiling or fire brick. As the gas is drawn through the cellular passages, three or more feet in length, it is choked at the contracted discharge opening and thus said gas is forced to mingle with the air which is supplied thereto through the various air channels, whereby said gas forms a mixture that is approximately in a perfect state of combustion. The air admitted from the duct 18 to form perfect combustion passes through each individual vertical tile and is distributed on either side from the cross-grooves 33, and thus meets the gases as they come from the mixing chamber, adding the proper amount of oxygen to supply perfect combustion, which combustion takes place as the gases are forced through the contracted throat. The tiles or fire brick which form the cellular partition, in the operation of the furnace, are brought to a white heat and as the gases pass therethrough, they are checked by the restricted discharge opening, to prevent escape prior to forming combustion.

From the foregoing description and operation it will be seen that the essential feature of my invention consists in providing a furnace, and method whereby spent bark or an analogous substance is passed by gravity over an angularly disposed grate surface and burned, the light carbureted hydrogen gas liberated being passed over a supplemental coal bed which furnishes a rich carbon gas that mingles therewith. This light carbureted gas which is liberated from the spent bark produces a large quantity of smoke, but when mingled with the rich carbon gas liberated from the bed of coals, it is enriched to such an extent that, by the proper admission of oxygen, perfect combustion is formed, it being understood that prior to the admission of air the gases are first mixed and then passed through a tiled cellular partition that is approximately at a white heat.

I claim:

In a method of utilizing disintegrated combustible fibrous substances as a fuel in a furnace, consisting of feeding the ignited fuel substance in an inclined sheet incidental to consumption thereof, admitting air thereto during its travel, freeing the burning fuel from coarse, non-combustible refuse during its travel by agitation, collecting the freed refuse at the base of the inclined sheet of traveling fuel, passing the light carbureted hydrogen gas that is freed from the burning fibrous substance over an ignited bed of coal that is partitioned from the inclined traveling sheet of fuel substance whereby the light carbureted hydrogen gas is mingled with the rich carbon liberated from the bed of coals and thus enriched to the proper degree of combustion, collecting the mingled hydrogen and carbon gases in a chamber whereby they are properly mixed, thereafter slightly confining, separating and superheating the confined mixed gases in their travel, and admitting air to said confined gases prior to their escape whereby the proper amount of oxygen is supplied for perfect combustion.

In testimony that I claim the foregoing I have hereunto set my hand at Milwaukee in the county of Milwaukee and State of Wisconsin in the presence of two witnesses.

GEO. M. CONWAY.

Witnesses:
  MAY DOWNEY,
  N. E. OLIPHANT.